United States Patent Office 3,585,241
Patented June 15, 1971

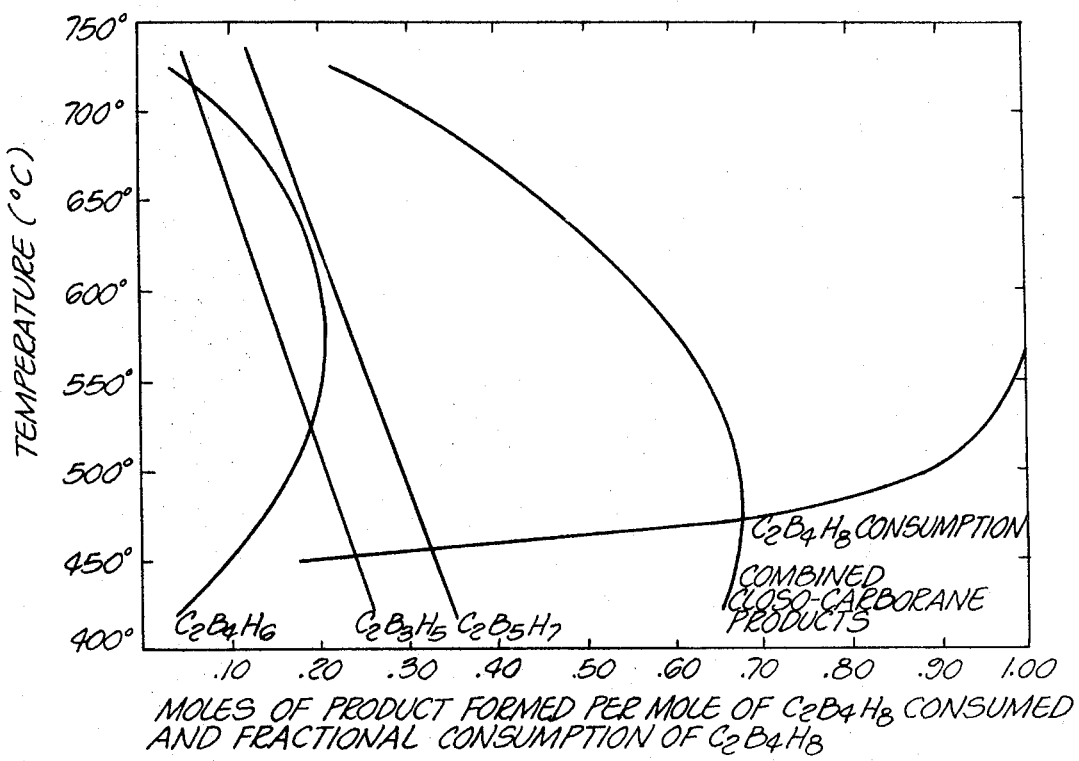

3,585,241
HIGH YIELD SYNTHESIS OF THE SMALLER CLOSO-CARBORANES, 1,5-$C_2B_3H_5$, 1,6-$C_2B_4H_6$ AND 2,4-$C_2B_5H_7$
Jerome F. Ditter, Covina, Eugene B. Klusmann, West Covina, and Robert E. Williams, La Canada, Calif., assignors to Aerojet-General Corporation, El Monte, Calif.
Filed Feb. 19, 1969, Ser. No. 800,661
Int. Cl. C07f 5/02
U.S. Cl. 260—606.5B         7 Claims

ABSTRACT OF THE DISCLOSURE

This patent describes a process for the high yield syntheses of the three closo-carboranes, 1,5-$C_2B_3H_5$, 1,6-$C_2B_4H_6$, and 2,4-$C_2B_5H_7$ from the nido-carborane, 4,5-$C_2B_4H_8$ in a continuous flow process utilizing short-term heating of 4,5-$C_2B_4H_8$ at relatively high temperatures. At about 460° C. and 10 mm. absolute pressure, the above-mentioned closo-carboranes are produced in the approximate ratio of 40:20:40 respectively, with essentially negligible loss of 4,5-$C_2B_4H_8$, while at higher temperatures and pressures the product ratio changes somewhat and the yields decrease accordingly.

BACKGROUND OF THE INVENTION

The first closo-carboranes discovered, 1,5-$C_2B_3H_5$, 1,6- (and 1,2-) $C_2B_4H_6$, and 2,4-$C_2B_5H_7$, with the respective systematic names closo-1,5-dicarbapentaborane-5, closo-1,6-dicarbahexaborane-6, and closo - 2,4 - dicarbaheptaborane-7, were initially produced only in trace amounts from $B_5H_9$ and HCCH in a silent electric-discharge apparatus, and their derivative chemistry consequently has suffered from the lack of ready availability. In striking contrast the initially realized yields of the icosahedral closo-dicarbadodecaborane-12, $C_2B_{10}H_{12}$, which was discovered and characterized independently of the small closo-carboranes, were much greater. Consequently its derivative chemistry, including the production of superior polymers by incorporation of —$C_2B_{10}H_{12}$— moieties into silicones, has far outdistanced the derivative chemistry of 1,5-$C_2B_3H_5$, 1,6-$C_2B_4H_6$, and 2,4-$C_2B_5H_7$.

The present invention is, therefore, believed to represent a major contribution to the art in that for the first time it is possible to synthesize the smaller molecular weight closo-carboranes in a good yield from the nido-carborane, 4,5-$C_2B_4H_8$, which in turn is easily prepared from readily available starting materials. It is, therefore, anticipated that the present invention will find application to a wide field of synthesis procedures in this area of chemistry. The best previous method for preparing any of the smaller closo-carboranes involved batch heating of 4,5-$C_2B_4H_8$ at about 340° C. for 24–48 hours, and moreover the only closo-carborane formed in reasonably good yield by this method was 2,4-$C_2B_5H_7$ (yields of 30–40%); 1,5-$C_2B_3H_5$ and 1,6-$C_2B_4H_6$ were formed in only trace amounts.

SUMMARY OF THE INVENTION

Briefly, the present invention comprises a novel process for the high yield syntheses of the three lower molcular weight closo-carboranes, 1,5-$C_2B_3H_5$, 1,6-$C_2B_4H_6$, and 2,4-$C_2B_5H_7$ from the nido-carborane, 4,5-$C_2B_4H_8$ in a continuous flow process utilizing short-term heating of 4,5-$C_2B_4H_8$ at elevated temperatures.

The present invention has as its major object an improved synthesis of the three closo-carboranes 1,5-$C_2B_3H_5$, 1,6-$C_2B_4H_6$ and 2,4-$C_2B_5H_7$.

More specifically, it is an object of the present invention to provide a high yield synthesis route for these closo-carboranes from readily available starting materials which, though relatively expensive at present in the case of one compound (pentaborane-9), are expected eventually to become relatively inexpensive.

It is also an object of the present invention to provide effective quantity of closo-carboranes which will facilitate the synthesis of many new derivative compounds based on the closo-carboranes.

These and other objects and advantages of this invention will be apparent from the more detailed description which follows.

DESCRIPTION OF THE PREFERRED EMBODIMENTS

The utilization of high temperature, and short resident time conditions as more fully hereinafter described, results in nearly quantitative conversion of 4,5-$C_2B_4H_8$ into the three closo-carboranes. Furthermore, the process of the present invention can, by the introduction of appropriate additives and by temperature changes, be made biased to a considerable extent toward the production of any one of the three closo-carboranes.

It is considered to be particularly significant that the three closo-carboranes can be prepared by the present invention in quantity from the antecedent reagents pentaborane-9 and acetylene by way of 4,5-$C_2B_4H_8$. Inasmuch as it is known that pentaborane-9 may be prepared in yields of about 80% or higher from diborane, and since it is also known that 4,5-$C_2B_4H_8$ can be obtained in yields of about 40% from pentaborane-9 and acetylene, it can be seen that the overall synthesis of the closo-carboranes is now quite favorable.

For these experiments, the reaction chamber, about 65 cc. in volume, consisted of a 0.75-in. O.D. stainless steel tube heated over a length of 13 in. The reactant nido-carborane (and diluent, when used) was metered into the reaction chamber via precalibrated flow meters through a fog nozzle just upstream of the furnace. At this point the temperature was estimated to be about 100° C., high enough to present condensation of the reactant but no so hot as to initiate its decomposition prematurely. In all experiments in which the reaction pressure was to exceed the vapor pressure of 4,5-$C_2B_4H_8$ (0.25 atm. or above), the 4,5-$C_2B_4H_8$ was metered in as a liquid, while below that pressure it was metered in as a vapor. The pressure in the reaction chamber was controlled by a glass Cartesian diver manostat located between the reaction zone and the cold trap.

The furnace temperature in most of the experiments was controlled by a Gardsman Model J "on-off" controller coupled through a Variac. The sensing thermocouple with a cold-junction compensation was inserted in the annular space between the tube furnace and the reacton. In later experiments, where more precise control was desired, we measured the temperature with a precision potentiometer and manually controlled the furnace by fine-positioning of a Variac dial.

The cold-trap temperature was regulated by means of a copper-constantan thermocouple and a West controller, which operated a solenoid valve through which liquid nitrogen flowed on demand. This allowed us to set the trap temperature, when needed, above the condensation point of argon, which boils at —185° C. at 1 atm.

To measure the amount of condensable product from a given run, we vacuum transferred it from the original trapping system to a calibrated volumetric bulb and measured its pressure; we then transferred it to an evacuated 1-l. bulb equipped with a silicone plug. All samples were of such volume as to be completely vaporized in the 1-l. bulb. To this bulb was then added argon gas until the total pressure reached about 780 mm. After allowing time for complete diffusion of gases in the 1-l. bulb, a 20-cc. aliquot was extracted by means of a hypodermic syringe inserted through the silicone plug. The contents of the syringe were then emptied into a gas chromatograph equipped with a ⅜-in. by 20-ft. column of Apiezon N on Chromosorb P, held generally at a temperature around 100° C. The carrier gas was helium, flowing at 85cc./min.; the detector was a thermal conductivity cell (katharometer). Elution times (approximate) were as follows: argon, 2.5 min.; $1,5-C_2B_3H_5$, 5 min.; $1,6-C_2B_4H_6$, 7 min.; $1,2-C_2B_4H_6$, 8.5 min.; $2,4-C_2B_5H_7$, 13 min.; $4,5-C_2B_4H_8$, 16 min. Initial identifications were made with a mass spectrometer, and percentages were determined by measuring the gas chromatography traces with a planimeter. The data obtained in these experiments are based on the assumption of equal senstiviiies toward the thermal conductivity cell, although it is known that various carboranes indicated slight differences in sensitivities, particularly with respect to the nido-carborane $4,5-C_2B_4H_8$, which had a slightly higher sensitivity than any of the closo-carboranes.

The data for this work is contained in the following table which is presented solely to illustrate the invention.

The largest and most consistent set of runs (No. 7–22) was made at 0.25 atm., and although the yields are not as high as in later runs at 10 mm., the data reveal some interesting things about the types of reactions that occur Yield data for the individual closo-carborane products and total yield and percent conversion are shown in the accompanying drawing, in which data points have been deleted for clarity.

The experiments that were conducted at 10 mm. pressure are indicative only of the best overall yields (quantitative), but in an actual operation one is obviously satisfied with a lower yield if the total quantity of products is increased. Consequently, a synthesis at 0.25 atmosphere with 65% yield can be much more desirable than at 10 mm. pressure with 100% yield. Furthermore, a temperature of 550 °C. wherein all of the $4,5-C_2B_4H_8$ reactant is consumed may be preferable to a temperature of 450° C. in which only a third of the reactant is used up, even though there may be a substantial disparity in yields in the two cases.

The yields of $1,5-C_2B_3H_5$ and $2,4-C_2B_5H_7$ (based on moles of $4,5-C_2B_4H_8$ consumed) decrease linearly as the temperature increases, indicating that the rates of decom-

TABLE.—EXPERIMENTAL DATA ON THE PYROLYSIS OF $C_2B_4H_8$

| Run No. | Temp., °C. | Reactor press. (abs.), atm. | $C_2B_4H_8$ input, cc. (STP) | $C_2B_4H_8$ concn., percent | Nominal residence, sec. | Duration of run, sec. | Fraction of $C_2B_4H_8$ consumed | Moles of product per mole of $C_2B_4H_8$ consumed | | | | |
|---|---|---|---|---|---|---|---|---|---|---|---|---|
| | | | | | | | | $1,5-C_2B_3H_5$ | $1,6-C_2B_4H_6$ | $1,2-C_2B_4H_6$ | $2,4-C_2B_5H_7$ | Total |
| 1 | 600 | 1 | 111 | 17.0 | 2.8 | 90 | 0.955 | 0.054 | 0.147 | 0.004 | 0.160 | 0.365 |
| 2 | 600 | 2 | 111 | 9.3 | 3.1 | 90 | 1.00 | 0.080 | 0.186 | 0.003 | 0.200 | 0.469 |
| 3 | 600 | 3 | 111 | 6.3 | 3.1 | 90 | 1.00 | 0.096 | 0.200 | 0.007 | 0.202 | 0.505 |
| 4 | 600 | 0.5 | 111 | 29.1 | 2.4 | 90 | 1.00 | 0.150 | 0.235 | 0.004 | 0.161 | 0.550 |
| 5 | 600 | 1 | 88 | 17.0 | 5.1 | 120 | 0.99 | 0.116 | 0.275 | 0.003 | 0.237 | 0.631 |
| 6 | 600 | 0.5 | 148 | 28.9 | 2.3 | 120 | 1.00 | 0.127 | 0.257 | 0.004 | 0.234 | 0.622 |
| 7 | 600 | 0.25 | 111 | 44.7 | 1.8 | 90 | 1.00 | 0.132 | 0.224 | 0.002 | 0.223 | 0.581 |
| 8 | 600 | 0.25 | 85 | 69.7 | 1.2 | 30 | 1.00 | 0.145 | 0.225 | 0.002 | 0.225 | 0.597 |
| 9 | 600 | 0.25 | 85 | 69.7 | 1.2 | 30 | 1.00 | 0.099 | 0.167 | 0.004 | 0.153 | 0.423 |
| 10 | 700 | 0.25 | 85 | 69.4 | 1.0 | 30 | 0.99 | 0.069 | 0.084 | 0.002 | 0.144 | 0.299 |
| 11 | 550 | 0.25 | 85 | 69.4 | 1.3 | 30 | 0.90 | 0.182 | 0.203 | 0.003 | 0.260 | 0.648 |
| 12 | 500 | 0.25 | 85 | 69.2 | 1.4 | 30 | 0.89 | 0.212 | 0.176 | 0.006 | 0.292 | 0.686 |
| 13 | 450 | 0.25 | 85 | 69.2 | 1.5 | 30 | 0.21 | 0.203 | 0.059 | 0.025 | 0.271 | 0.558 |
| 14 | 500 | 0.25 | 54 | 66.7 | 2.1 | 30 | 0.86 | 0.246 | 0.185 | 0.004 | 0.328 | 0.763 |
| 15 | 500 | 0.25 | 34 | 65.1 | 6.3 | 60 | 0.99 | 0.153 | 0.134 | Trace | 0.235 | 0.522 |
| 16 | 500 | 0.25 | 60 | 64.5 | 19.6 | 300 | 0.98 | 0.191 | 0.172 | Trace | 0.314 | 0.677 |
| 17 | 500 | 0.25 | 85 | 94.2 | 1.9 | 30 | 0.86 | 0.237 | 0.167 | 0.007 | 0.306 | 0.717 |
| 18 | 450 | 0.25 | 60 | 64.5 | 2.1 | 300 | 0.57 | 0.229 | 0.097 | 0.007 | 0.331 | 0.664 |
| 19 | 675 | 0.25 | 85 | 69.7 | 1.2 | 30 | 1.00 | 0.070 | 0.108 | 0 | 0.168 | 0.346 |
| 20 | 725 | 0.25 | 85 | 69.4 | 1.1 | 30 | 1.00 | 0.035 | 0.025 | 0 | 0.140 | 0.200 |
| 21 | 475 | 0.25 | 85 | 69.4 | 1.4 | 30 | 0.40 | 0.275 | 0.125 | 0.014 | 0.351 | 0.765 |
| 22 | 700 | 0.25 | 167 | 66.3 | 2.7 | 15 | 0.99 | 0.081 | 0.111 | 0 | 0.188 | 0.380 |
| 23 | 500 | 3 | 85 | 17.1 | 4.0 | 30 | 0.98 | 0.198 | 0.176 | Trace | 0.339 | 0.713 |
| 24 | 461 | ¹10 | 20 | 100 | 2.9 | 180 | 0.41 | 0.391 | 0.195 | 0.001 | 0.399 | 0.986 |
| 25 | 467 | ¹10 | 20 | 100 | 2.8 | 180 | 0.55 | 0.338 | 0.178 | 0.013 | 0.311 | 0.840 |
| 26 | 459 | ¹10 | 20 | 100 | 2.9 | 180 | 0.37 | 0.386 | 0.191 | 0.024 | 0.396 | 0.997 |
| 27 | 452 | ¹10 | 23 | 100 | 2.9 | 180 | 0.23 | 0.396 | 0.159 | 0.039 | 0.415 | 1.009 |
| 28 | 446 | ¹10 | 20 | 100 | 2.9 | 180 | 0.24 | 0.410 | 0.152 | 0.033 | 0.380 | 0.975 |
| 29 | 456 | ¹10 | 4 | 100 | 14.4 | 180 | 0.82 | 0.071 | 0.043 | Trace | 0.077 | 0.141 |
| 30 | 449 | ¹10 | 37 | 100 | 0.26 | 30 | 0.16 | 0.154 | 0.037 | 0.027 | 0.171 | 0.389 |
| 31 | 449 | ¹10 | 51 | 100 | 0.38 | 60 | 0.15 | 0.331 | 0.111 | 0.058 | 0.507 | 1.007 |
| 32 | 449 | ¹10 | 37 | 100 | 0.52 | 60 | 0.22 | 0.372 | 0.122 | 0.051 | 0.440 | 0.985 |
| 33 | 449 | ¹10 | 28 | 100 | 0.69 | 60 | 0.32 | 0.379 | 0.117 | 0.027 | 0.436 | 0.959 |
| 34 | 448 | ¹10 | 32 | 100 | 0.91 | 90 | 0.37 | 0.352 | 0.155 | 0.021 | 0.475 | 1.003 |

¹ Millimeters.

The data obtained in the 34 experiments represent a fairly wide range of temperatures and residence times and several selected pressures and argon concentrations. Most of the data were obtained at 0.25 atm. pressure because it happened to be convenient and because early runs at several pressures did not indicate any gross differences due to pressure changes (excepting at very low pressures, as discussed later). The run times generally were short, as low as 30 sec. for about one-third of the runs, and consequently errors in total recovery data and in percent conversion due to surges of the reactant at the beginning of some of the runs were fairly substantial in magnitude. The yield data, however, were internally consistent to a remarkable degree, considering the wide ranges of residence times, dilution, etc. Run No. 30 gave anomalously low yield data for reasons unknown, and run No. 29, wherein the residence time in the furnace was excessively long (14 sec.), showed a high percentage conversion of $4,5-C_2B_4H_8$ and a low percentage of recoverable product (14%). Obviously, the useful products have to be removed as quickly as possible from the reaction zone to minimize further interaction and consequent loss.

position of the two products are more rapid than the rates of formation. The fact that the $1,5-C_2B_3H_5$ and $2,4-C_2B_5H_7$ plots are parallel suggests strongly that both are formed from the same (disproportionation) reaction, i.e. $2C_2B_4H_8 \rightarrow C_2B_3H_5 + C_2B_5H_7 + H_2$. The fact that the $2,4-C_2B_5H_7$ yield is always slightly higher than that of $1,5-C_2B_3H_5$ would again seem to be a reflection of the relative stabilities of the two compounds.

The plot of the $1,6-C_2B_4H_6$ yield vs. temperature, on the other hand, is radically different from the other two. Initially the yield increases with temperature, but then at higher temperatures it drops off as the effects of decomposition become predominant. From the shape of the $1,6-C_2B_4H_6$ curve it is obvious that the reaction mechanism whereby $1,6-C_2B_4H_6$ is formed is different from the disproportionation reaction by which $1,5-C_2B_3H_5$ and $2,4-C_2B_5H_7$ are formed. A simple explanation would be the loss of hydrogen from $4,5-C_2B_4H_8$, i.e.

$$C_2B_4H_8 \rightarrow C_2B_4H_6 + H_2$$

In most of the runs, the symmetrical 1,6 isomer is the predominant one, but this again most probably simply reflects relative stabilities inasmuch as the unsymmetrical isomer, 1,2-$C_2B_4H_6$, is known to undergo rapid rearrangement to the symmetrical 1,6-$C_2B_4H_6$ at elevated temperatures. With very short residence times and at reasonably low temperatures (No. 30–40), the 1,2-isomer was found in somewhat higher percentages. This suggests either that the two isomers are formed initially in equal abundance (statistical probability) or that the 1,2 compound is formed first and it in turn generates the 1,6 species by rearrangement. Since the two carbon atoms are adjacent in the precursor 4,5-$C_2B_4H_8$ molecule, it is not unreasonable to suppose that the 1,2 precedes the 1,6 isomer in the reaction sequence.

In the accompanying drawing the curve which shows "combined closo-carborane products"

(1,5-$C_2B_3H_5$+1,6-$C_2B_4H_6$+2,4-$C_2B_5H_7$)

was constructed simply by adding up the values of the yield plots of these individual products. It was not obtained by plotting experimentally measured volumes (total volumes of condensables minus the volume of unreacted 4,5-$C_2B_4H_8$) because these data were not sufficiently consistent to determine the shape or position of the curve with any degree of accuracy. Similarly, since the 4,5-$C_2B_4H_8$ conversion data (also plotted in the drawing) deviated considerably from the "norm" in some runs, the position of the plotted curve, "$C_2B_4H_8$ consumption," is only approximate.

In this set of experiments, i.e., under 0.25 atm. pressure and with argon diluent, the maximum yield of products (68%) occurs at about 470° C., as shown in the drawing. At this temperature the two curves, one indicating total yield and the other indicating 4,5-$C_2B_4H_8$ consumed, intersect (coincidentally). If the temperature is raised to 575° C. or above, assuming no drastic reduction in residence time, all of the 4,5-$C_2B_4H_8$ is consumed in the reaction while the total yield drops to about 60%. In addition the product distribution also changes substantially; e.g., at 475° C. the individual yields of 1,5-$C_2B_3H_5$, 1,6-$C_2B_4H_6$ and 2,4-$C_2B_5H_7$ are about 22, 14, and 32%, respectively, while at 575° C. these figures change to 15, 21, and 23%.

Initial experimentation at relatively high pressures (runs 1–6) had indicated no great influence of pressure on total yield, but when we conducted the experiments at very low pressures (10 mm.) and with no diluent, the yields increased substantially. Runs 24–34 show (last column of the accompanying table) that the yields, based on 4,5-$C_2B_4H_8$ consumed, are close to 100%, at least for reaction zone temperatures in the vicinity of 450–460° C. and residence times on the order of a few seconds or less. Under these conditions the consumption of 4,5-$C_2B_4H_8$ reactant is 25–30%, while the product distribution of 1,5-$C_2B_3H_5$, 1,6-$C_2B_4H_6$, and 2,4-$C_2B_5H_7$ is on the order of 40, 20, and 40%, respectively.

One of the major features and advantages of this invention particularly at the low pressures (e.g., 10 mm. absolute) is that a nearly quantitative yield can be obtained, which results in a high degree of cleanliness. Solid residues do not build up in the reactor, and consequently the equipment does not have to be disassembled and cleaned at frequent intervals. Furthermore, scaling up the process is relatively easy since one can simply use a cluster of reactors of the same length and diameter as that used in these experiments or one single reactor of substantially larger diameter and greater length. It is to be expected that the process of this invention will be widely adopted in the field of closo-carborane synthesis.

Having fully described the invention it is intended that it be limited only by the lawful scope of the appended claims.

We claim:

1. A novel process for the high yield syntheses of the three closo-carboranes, 1,5-$C_2B_3H_5$, 1,6-$C_2B_4H_6$, and 2,4-$C_2B_5H_7$ from the nido-carborane, 4,5-$C_2B_4H_8$ in a continuous flow process utilizing short-term heating of 4,5-$C_2B_4H_8$ at elevated temperatures.

2. The process of claim 1 wherein the reaction is carried out at a temperature of about 450–500° C.

3. The process of claim 1 wherein the residence time is about 1 to 3 seconds.

4. The process of claim 1 wherein the reaction is carried out at a temperature of about 550° C.

5. The process of claim 1 wherein the reaction is carried out at a pressure of about 0.25 atmosphere.

6. The process of claim 1 wherein the reaction is carried out at reduced pressure below about 10 mm. absolute.

7. A novel process for the high yield syntheses of the three closo-carboranes, 1,5-$C_2B_3H_5$, 1,6-$C_2B_4H_6$, and 2,4-$C_2B_5H_7$ from the nido-carborane, 4,5-$C_2B_4H_8$ in a continuous flow process utilizing short-term heating of 4,5-$C_2B_4H_8$ at temperatures of about 450–500° C. for about 1 to 3 seconds.

References Cited

UNITED STATES PATENTS

| | | | |
|---|---|---|---|
| 3,391,194 | 7/1968 | Lawton et al. | 260—606.5 |
| 3,410,911 | 11/1968 | Klein et al. | 260—606.5 |
| 3,420,889 | 1/1969 | Onak | 260—606.5 |

TOBIAS E. LEVOW, Primary Examiner

W. F. W. BELLAMY, Assistant Examiner